United States Patent [19]

Mori et al.

[11] 3,856,685

[45] Dec. 24, 1974

[54] LUBRICANT COMPOSITIONS

[75] Inventors: Kenjiro Mori, Takarazuka;
Shigueaqui Ikebe, Toyonaka;
Masaaki Hirooka, Ibaragi; Takashi Kato, Takatsuki, all of Japan

[73] Assignee: Sumitomo Chemical Company, Limited, Osaka, Japan

[22] Filed: Dec. 4, 1972

[21] Appl. No.: 311,526

[30] Foreign Application Priority Data
Dec. 2, 1971  Japan............................. 46-97641

[52] U.S. Cl.......... 252/56 R, 260/80.78, 260/80.81, 260/86.7
[51] Int. Cl.............................................. C10m 1/28
[58] Field of Search ........ 252/56 R; 44/62; 260/885

[56]  References Cited
UNITED STATES PATENTS

| | | | |
|---|---|---|---|
| 3,069,381 | 12/1962 | Nozaki............................. | 252/56 R |
| 3,089,832 | 5/1963 | Black et al..................... | 252/56 R X |
| 3,251,906 | 5/1966 | Bauer............................. | 260/885 X |
| 3,518,197 | 6/1930 | Eckert............................. | 252/56 R |

FOREIGN PATENTS OR APPLICATIONS

| | | |
|---|---|---|
| 1,112,749 | 5/1968 | Great Britain |
| 1,123,723 | 8/1968 | Great Britain |

OTHER PUBLICATIONS

Billmeyer, "Textbook of Polymer Science," (1962) pages 333 & 334.

*Primary Examiner*—W. Cannon
*Attorney, Agent, or Firm*—Stevens, Davis, Miller & Mosher

[57]  ABSTRACT

A lubricant composition comprising 100 parts by weight of an oil having a lubricating oil viscosity and 0.1 to 50 parts by weight of a copolymer of isobutylene and/or propylene with at least one acrylic ester compound, especially a copolymer of isobutylene with at least one acrylic ester. In said composition, the improving effect of the visocity index is excellent and the composition is excellent in shear stability, thermal resistance, aging resistance, and demulsibility.

4 Claims, No Drawings

LUBRICANT COMPOSITIONS

This invention relates to a lubricant composition. More particularly, this invention relates to a lubricant composition having an improved viscosity index, which contains a copolymer of olefin and acrylic ester compound.

The base oil for a lubricating oil changes markedly in viscosity with a change in temperature, the viscosity being generally decreased with increase in temperature. In order that the viscosity of a lubricant composition may not greatly change with a temperature change in internal combustion engines and lubricated machinery, there have been developed a great number of additives called viscosity index improvers, which keep the viscosity change accompanying a temperature change to a minimum.

The viscosity index improvers are, in general, preferably polymers, and, for example, polymers of alkyl methacrylates and polyolefins (e.g. polyisobutylene) are most widely known as the polymers.

These viscosity index improvers effectively enhance the viscosity index of lubricanting oils and make it possible to supply general-purpose lubricants which have a sufficiently low initial viscosity for use in cold weather, yet show a favorable viscosity at high temperatures.

On the other hand, a lubricating oil is subjected to a high shearing stress in view of its uses, and hence, a viscosity index improver is required to be sufficiently stable against the shearing stress.

Polyalkyl methacrylates are preferred because of their prominent effect of improving the viscosity index, but are markedly inferior in shear stability; whereas polyisobutylene is remarkably superior in shear stability, but is insufficient in its effect of improving the viscosity index.

Under these circumstances, it has been commercially desired to develop a viscosity index improver which is excellent in both viscosity index improving effect and shear stability.

As a result of continued extensive studies, the present inventors have found that a distinguished viscosity index improving effect and a high shear stability are both possessed by a copolymer of propylene and/or isobutylene with at least one acrylic ester compound represented by the formula:

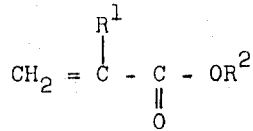

wherein $R^1$ is a hydrogen or halogen atom, or a $C_{1-20}$-hydrocarbon or -halohydrocarbon radical, and $R^2$ is a $C_{1-20}$-hydrocarbon or -halohydrocarbon radical.

The acrylic ester compounds in this invention are acrylic esters, methacrylic esters, and other α-substituted acrylic esters. Examples of $R^1$ are hydrogen, alkyl radicals, aryl radicals, aralkyl radicals, alkylaryl radicals, cycloalkyl radicals, and halogen-substitutes of these radicals. Of these, there are particularly preferred hydrogen and methyl. In other words, the preferable acrylic ester compounds are acrylic esters and methacrylic esters, the former being especially preferred. The ester group represented by $R^2$ may be any one of the hydrocarbon radicals including such preferable radicals as alkyl, aryl, aralkyl, alkylaryl, cycloalkyl, alkenyl, and halogen-substituted radicals derived from these hydrocarbon radicals. Examples of these radicals are methyl, ethyl, propyl, butyl, pentyl, hexyl, 2-ethylhexyl, n-octyl, decyl, dodecyl, myristyl, palmityl, and stearyl; mixtures thereof; and halogen-substitutes of these radicals.

Examples of the acrylic ester compounds are methyl acrylate, ethyl acrylate, propyl acrylate, n-butyl acrylate, crotyl acrylate, n-amyl acrylate, n-hexyl acrylate, phenyl acrylate, 2-ethylhexyl acrylate, lauryl acrylate, myristyl acrylate, palmityl acrylate, stearyl acrylate, oleyl acrylate, linoleyl acrylate, linolenyl acrylate, citronellyl acrylate, cinnamyl acrylate, 2-chloroethyl acrylate, 3-chloropropyl acrylate, methyl methacrylate, n-butyl methacrylate, 2-ethylhexyl methacrylate, dodecyl methacrylate, myristyl methacrylate, palmityl methacrylate, dodecyl α-chloroacrylate, 2-ethylhexyl α-ethylacrylate, and mixtures of these compounds. Since, generally, compounds having a small number of carbon atoms are superior in viscosity index improving effect, while compounds having a large number of carbon atoms are superior in pour point depressing action, it is effective and preferable, in most cases, to use a copolymer having a wide ester group distribution or/and a mixture of such copolymers.

The copolymers for use in this invention may be copolymers of propylene and/or isobutylene with the above-said acrylic ester compounds, or may be interpolymers containing these components and other components, particularly up to 30 mole percent of ethylenically unsaturated compounds having 30 or less carbon atoms as constituents. Thus, the interpolymer may contain, for example, a nitrogen-containing compound or an ethereal oxygen-containing vinyl compound, preferably an acrylic ester compound, which has detergent and dispersing properties, in such an amount that the characteristics of the composition of this invention may not be impaired. In this case, heterocyclic vinyl compounds such as vinylpyridine and vinylpyrrolidone or unsaturated ether compounds such as ethereal oxygen-containing acrylic esters may be used as the nitrogen or oxygen-containing vinyl compound. As the said other components, there may also be used, haloolefins, diolefins, carboxylic acids, unsaturated esters, acrylonitrile, acrylic acid, and acryloyl halides.

The ratio of propylene and/or isobutylene to the aforesaid acrylic ester compound contained in the copolymer is usually 25–75 mole percent to 75–25 mole percent, preferably 40–60 mole percent to 60–40 mole percent. A copolymer containing both components in a ratio of approximately 50 to 50 mole percent is particularly preferable, and especially, a copolymer consisting essentially of an alternating copolymer has an excellent effect. It can be considered that a homopolymer of an acrylic or methacrylic ester is poor in shear stability, but a copolymer in which the ester units are inserted between propylene units or isobutylene units has a remarkably improved shear stability.

In recent years, the performance characteristics required for a lubricating oil have become increasingly advanced, and there is a request to develop viscosity index improvers having high performance capable of substituting for conventional improvers typified by polymethacrylic esters and polybutenes. To meet the request, tests have been carried out on various compounds. Copolymers of certain olefins with monomers containing the ester group are included in the tested compounds, but only olefins which can be copolymerized by a radical polymerization, i.e., ethylene and butadiene, have been used.

The copolymer of this invention, which has been prepared by copolymerizing at least one olefin selected from the group consisting of propylene and isobutylene with at least one monomeric acrylic ester compound, is much superior in viscosity index improving effect and shear stability effect to the copolymer obtained by using ethylene, and this fact is quite unexpected. As seen from Brit. Pat. No. 1,112,749, the viscosity index of, for example, an ethylene copolymer is 110–126, while that of the present copolymer exceeds 140, and there is a great difference between the two.

Among copolymers used in this invention, particularly the alternating copolymer shows a more favorable effect of improving the shear stability because all the acrylic ester compound units are separated from one another by the interposed propylene or isobutylene units. In addition, it has heretofore been difficult to obtain in high yields a high molecular weight copolymer of the aforesaid acrylic ester compound with propylene or isobutylene as olefin component, and more difficult to obtain a copolymer containing the two components in a ratio of approximately 50 mole percent. The molecular weight of the resulting copolymer was considerably low. Further, in order to obtain a copolymer of homogeneous composition by a conventional random polymerization method, it was necessary either to keep the conversion very low or to charge the monomers continuously and skillfully corresponding to their reactivities over the whole period of polymerization. According to the alternating copolymerization method, there is obtained in high yields an alternating copolymer of a strictly uniform composition independent of the proportion of charged monomers to each other, unlike the said random polymerization method, with any desired molecular weight selected from a wide range.

For the purpose of obtaining a copolymer to be used in this invention, it is generally preferable to conduct the copolymerization in the presence of a halide of metals, preferably in the presence of at least one member selected from the group consisting of compounds of aluminum, boron, zinc and tin. The methods disclosed in, for example, U.S. Pat. Nos. 2,411,599 and 3,183,217 are recommendable for synthesizing the copolymer. For the purpose of synthesizing an alternating copolymer, in particular, the recommendable methods are disclosed in, for example, British Pat. Nos. 1,089,279; 1,123,722; 1,123,723 and 1,187,105. It is particularly effective to use at least one of the organoaluminum halides and organoboron halides, together with, if necessary, other activators such as oxygen, organic peroxides, and transition metal compounds.

The copolymers frequently used in this invention are those having an intrinsic viscosity of 0.02 to 3 dl/g, preferably 0.1 to 1 dl/g, as measured in benzene at 30°C. These copolymers can be mixed in a conventional manner with a conventional lubricating oil. The copolymer is used in a proportion of generally 0.1 to 50 parts by weight, preferably 0.5 to 30 parts by weight, particularly preferably 1 to 10 parts by weight, per 100 parts by weight of the lubricating oil. The copolymers can be used alone or in combination of two or more to obtain the lubricant composition of this invention.

The conventional lubricating oil, into which the copolymers of this invention are incorporated, may be selected from a wide range including mineral oils such as naphthene base oils, paraffin base oils and mixed base oils derived from petroleum; synthetic oils such as alkylene oxide polymers; and aromatic oils such as alkyl phenyl diethers, alkylbiphenyls, alkylbiphenyl ethers, and polyphenyls. The lubricating oil may contain other known conventional additives such as, for example, conventional detergents, dispersants, antioxidants, pour point depressants, other viscosity index improvers, and the like.

The usefulness of this invention is illustrated below with reference to an Example, but the invention is not limited to the Example.

EXAMPLE

To 100 parts by weight of a base oil was added and dissolved 10, 5 or 2.5 parts by weight of each of the present copolymers Nos. 1 to 7 having physical properties as shown in Table 1. Every polymer used was completely dissolved in the base oil to form a single phase.

The viscosity was measured at 37.78°C and 98.89°C by the method specified in JIS K 2,283 and the viscosity index was calculated according to the calculating method for viscosity index specified in JIS K 2,284.

The percentage loss of viscosity, i.e. shear stability, upon exposure to ultrasonic energy was measured referring to the method specified in ASTM D 2603-67T.

In order to illustrate the usefulness of the copolymers of this invention, conventional viscosity index improvers, as shown in Table 1, Nos. 8 to 10, were added to and dissolved in the base oil in a manner similar to that mentioned above. The viscosities of the resulting lubricant compositions were measured by the same method as mentioned above, and the viscosity index and the percentage loss of viscosity upon exposure to an ultrasonic energy were determined.

The results obtained were as shown in Table 1.

100 Neutral was used as the base oil.

The percentage loss of viscosity upon exposure to ultrasonic energy was calculated by the following equation:

Percentage loss of viscosity $= V_o - V_f/V_o - V_o' \times 100$ wherein $V_o$: Viscosity (cst) at 98.89°C of the lubricant composition before exposure, $V_f$: Viscosity (cst) at 98.89°C of the lubricant composition after exposure, $V_o'$: Viscosity (4.36 cst) at 98.89°C of the base oil before exposure.

TABLE I

| | Viscosity index improver | | | |
|---|---|---|---|---|
| No. | Monomer composition | Mole ratio | [η] (benzene, 30°C) (dl/g) | Amount added to base oil |
| 1 | Isobutylene/2-Ethylhexyl acrylate | 51.9/48.1 | 0.52 | 10 2.5 |

TABLE I – Continued

| No. | Monomer composition | Mole ratio | $[\eta]$ (benzene, 30°C) (dl/g) | Amount added to base oil | Viscosity (cst) 37.78°C | Viscosity (cst) 98.89°C | Viscosity index | Viscosity at 98.89°C (cst) Before exposure | Viscosity at 98.89°C (cst) After exposure | Percentage loss of viscosity upon exposure to ultrasonic energy (%) |
|---|---|---|---|---|---|---|---|---|---|---|
| 2 | Isobutylene/Lauryl acrylate | 50.8/49.2 | 0.43 | 2.5 | 112.50 | 22.28 | 143 | 22.28 | 19.12 | 17.6 |
| 3 | Propylene/2-Ethylhexyl acrylate | 49.7/50.3 | 0.88 | 2.5 | 38.53 | 7.09 | 148 | 7.09 | 6.08 | 36.1 |
| 4 | Isobutylene/2-Ethylhexyl acrylate | 43.9/56.1 | 0.36 | 2.5 | 38.45 | 7.34 | 147 | 7.34 | 6.18 | 38.2 |
| 5 | Isobutylene/2-Ethylhexyl methacrylate | 32.3/67.7 | 0.34 | 2.5 | 45.92 | 8.92 | 151 | 8.92 | 6.95 | 42.0 |
| 6 | Isobutylene/Lauryl acrylate/Diethylamino ethylacrylate | 48.4/38.4/13.2 | 0.22 | 2.5 | 43.38 | 8.21 | 148 | 8.21 | 6.45 | 45.1 |
| 7 | Isobutylene/n-Butyl acrylate/2-Ethylhexyl acrylate/Lauryl acrylate/Stearyl acrylate | 50/25/10/7.5/7.5 | 0.59 | 5 | 33.61 | 6.51 | 147 | 6.51 | 5.47 | 47.1 |
| 8 | 2-Ethylhexyl acrylate | — | 0.48 | 2.5 | 28.98 | 5.65 | 143 | 5.65 | 5.63 | 1.5 |
| 9 | Lauryl methacrylate | — | 0.51 | 2.5 | 27.24 | 7.22 | 177 | 27.24* | 24.58* | 9.8 |
| 10 | Isobutylene | — | — | 2.5 | 40.95 | 7.38 | 141 | 7.38 | 5.48 | 61.7 |
|  |  |  |  |  | 86.04 | 14.14 | 142 | 14.14 | 5.76 | 85.2 |
|  |  |  |  |  | 23.69 | 4.43 | 109 | 4.43 | 4.43 | 0 |

* Viscosity at 37.78°C using base oil with viscosity index of 110

What is claimed is:

1. A lubricant composition comprising 100 parts by weight of an oil having a lubricant viscosity and 0.1 to 50 parts by weight of at least one copolymer of isobutylene, propylene or both thereof with at least one acrylic ester compound represented by the formula

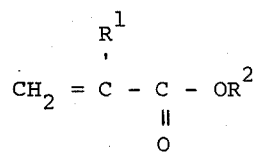

wherein $R^1$ is a hydrogen or halogen atom, or a $C_{1-20}$-hydrocarbon or -halohydrocarbon radical, and $R^2$ is a $C_{1-20}$-hydrocarbon or -halohydrocarbon radical, in which the intrinsic viscosity of the copolymer is 0.02 to 3 dl/g as measured in benzene at 30°C, and wherein the copolymer consists essentially of alternating copolymers in which the member selected from the group consisting of isobutylene and propylene units is linked solely to the acrylic ester units and the acrylic ester units are linked only to the member selected from the group consisting of isobutylene and propylene units.

2. A composition according to claim 1, wherein the acrylic ester compound is a combination of the acrylic esters in which the ester groups have various chain lengths.

3. A composition according to claim 1, wherein the acrylic ester compound is an acrylic ester, a methacrylic ester or a combination thereof.

4. A composition according to claim 1, wherein the copolymer consists of isobutylene and acrylic esters.

* * * * *